United States Patent [19]
Cox

[11] Patent Number: 5,593,113
[45] Date of Patent: Jan. 14, 1997

[54] METHODS AND APPARATUS FOR SELECTIVELY ATTACHING AND RELEASING MULTIPLE PAYLOADS SUSPENDED FROM AN AIRCRAFT

[76] Inventor: Donald P. Cox, 539 E. 400 South, Orem, Utah 84058

[21] Appl. No.: 384,414

[22] Filed: Feb. 6, 1995

[51] Int. Cl.⁶ .................................................... B64D 1/08
[52] U.S. Cl. ..................... 244/137.1; 244/137.4; 294/81.56; 294/82.26; 177/245; 73/862.621; 403/165
[58] Field of Search .............................. 244/137.1, 137.4, 244/118.1; 294/82.15, 82.26, 82.24, 87.1, 86.4, 81.56; 177/245, 244; 73/862.621; 310/232, 90; 403/165, 164

[56] References Cited

U.S. PATENT DOCUMENTS

| | | |
|---|---|---|
| 340,618 | 5/1943 | Magni et al. . |
| 2,379,383 | 6/1945 | Steel . |
| 2,651,533 | 9/1953 | Miller ........................................ 403/164 |
| 2,820,397 | 1/1958 | Durkin . |
| 3,656,796 | 4/1972 | Cook ........................................ 294/87.1 |
| 3,690,602 | 9/1972 | Marsh . |
| 3,838,836 | 10/1974 | Asseo et al. ............................. 244/137.4 |
| 3,946,971 | 3/1976 | Chadwick ................................ 244/137.4 |
| 4,256,012 | 3/1981 | Cowart et al. . |
| 4,267,987 | 5/1981 | McDonnell .............................. 244/137.4 |
| 4,378,919 | 4/1983 | Smith . |
| 4,575,028 | 3/1986 | Dean et al. . |
| 4,589,615 | 5/1986 | Walker, Jr. . |
| 4,826,109 | 5/1989 | Camus . |
| 4,881,601 | 11/1989 | Smith . |
| 5,238,208 | 8/1993 | Davis . |
| 5,499,785 | 3/1996 | Roberts et al. ............................... 244/2 |

OTHER PUBLICATIONS

Aeronautical Accessories, Inc. Product Literature for Hook Carrousel, (Part Nos. 099–186–390, 099–190–210).

*Primary Examiner*—Andres Kashnikow
*Assistant Examiner*—Tien Dinh
*Attorney, Agent, or Firm*—Workman, Nydegger & Seeley

[57] ABSTRACT

A multiple payload system comprising a sling assembly and a frame assembly for suspension from an aircraft. The sling assembly includes an elongated load bearing cable having a first end and a second end. A stress sensor used in measuring the weight of the payloads extends between the aircraft and the first end of the load bearing cable. A payload hook is also attached to the sling assembly with an anti-torque device extending between the second end of the load bearing cable and the payload hook. The anti-torque device permits the payload hook to freely rotate relative to the longitudinal axis of the load bearing cable. The frame assembly is attached to the payload hook and comprises an airframe with a plurality of payload hooks secured thereto. The payload hooks are used for selectively attaching and releasing multiple payloads. A stabilizing wing and a plurality of legs are also attached to the airframe. Finally, electrical means are also provided to permit selective actuation of the payload hooks and the load cells from the aircraft.

46 Claims, 8 Drawing Sheets

METHODS AND APPARATUS FOR SELECTIVELY ATTACHING AND RELEASING MULTIPLE PAYLOADS SUSPENDED FROM AN AIRCRAFT

BACKGROUND OF THE INVENTION

1. The Field of the Invention

The present invention relates to transporting payloads suspended from an aircraft. More specifically, the present invention discloses methods and apparatus for selectively attaching and selectively releasing multiple payloads suspended from an aircraft.

2. The Relevant Technology

Helicopters have long been used to deliver payloads of different size and shape. Traditionally, a cable is suspended from a helicopter having a hook attached to one end of the cable. By attaching the hook to a payload, the helicopter is able to transport the payload to a desired location. Suspending the payload beneath a helicopter permits the helicopter to transport oversized cargo, such as a jeep.

Furthermore, a helicopter is able to deliver the payload to unique and specific locations, such as on top of a building or in rugged terrain, where an airplane could not land. In addition, the use of a suspended cable permits a helicopter to deliver or receive cargo without actually having to land. By lowering the cable, a receiving party can remove or attach a payload to the hook. This is most beneficial with regard to emergency rescues and in delivering payloads in congested areas.

Although there are numerous benefits in using a conventional hook and cable assembly to deliver a payload suspended beneath a helicopter, several shortcomings are also found. For example, using a single cable and hook assembly typically only permits transporting a single payload per flight. Such an assembly necessitates numerous flights, costing both time and money, to deliver multiple payloads which cannot simultaneously be attached to a single hook.

Furthermore, to remove a payload from a conventional hook and cable assembly, either the helicopter must land or the payload must be lowered to the ground and manually removed from the hook. Such processes require both time and the necessity of a receiving party at the unloading location to unload the payload. The necessity of a receiving party to remove a payload is detrimental in an emergency situation where it would be preferable to jettison the payload during flight or where it is desirable to release a payload at a location where there is no receiving party.

In an attempt to alleviate these problems, carrousel hook systems have been made. The carrousel hook systems comprise a frame having a plurality of hooks attached thereto. The frame is suspended from a helicopter by a support cable. Likewise, an electrical cable extends from the helicopter to each of the hooks. By triggering a switch within the helicopter, the hooks can be consecutively opened, thereby releasing the attached loads.

Several problems or shortcomings, however, have also been encountered with the carrousel hook systems. Forces such as the wind and movement of the aircraft can result in rotation of the carrousel frame which in turn applies a torsional force on the support cables and the helicopter. Such a force can damage the cables and the connection to the helicopter. Likewise, the torsional force can affect the navigation ability of the helicopter.

The hooks and the carrousel hook system are designed to operate in a consecutive manner. For example, hook number 4 cannot be opened until hooks 1–3 have been opened. Such a configuration severely limits the ability of the operator to selectively release the attached payloads. It is also difficult for the operator to determine which of the hooks is next to release and if a payload has fully been removed from the hook. Furthermore, such a configuration does not permit all of the payloads to be dropped concurrently.

The current hook systems also do not address some of the general problems in the art. As with all aircraft, helicopters have a load limit. Exceeding the load capacity of a helicopter can affect the navigational ability of the aircraft or result in failure of the aircraft. Current embodiments for transporting cargo suspended from an aircraft provide no means other than manually weighing the cargo before loading to determine the weight of cargo. The ability to always know the weight of the payloads is especially important during repeated rapid loading and unloading of cargo.

In addition, since the payload is suspended beneath the helicopter, it can often be difficult for the pilot using conventional methods to accurately navigate the payload to an exact unloading position. This is especially difficult at night or in congested areas, such as within a jungle.

OBJECTS AND SUMMARY OF THE INVENTION

Accordingly, it is an object of the present invention to provide methods and apparatus for electrically and selectively releasing a payload suspended from an aircraft.

Another object of the present invention is to provide methods and apparatus for electrically and selectively releasing multiple payload suspended from an aircraft.

Still another object of the present invention is to provided methods and apparatus as discussed above in which multiple payloads can be repeatedly attached and released for suspension from an aircraft.

It is another object of the invention to provide methods and apparatus as discussed above in which the payloads can rotate freely when suspended from the aircraft without applying a torsional force to the aircraft.

Yet another object of the present invention is to provide methods and apparatus as discussed above in which the pilot of the aircraft having the payloads suspended therefrom is capable of knowing when a payload is attached or released from the aircraft without having to see the payload.

It is yet another object of the present invention to provide methods and apparatus as discussed above in which the payloads are stabilized during flight of the aircraft so as to minimize rotation of the payloads.

Another object of the present invention is to provide methods and apparatus for selectively weighing individual payloads or the total weight of the payloads as the aircraft suspends the payloads off the ground.

Still another object of the present invention is to provide methods and apparatus as discussed above wherein the pilot of the aircraft having payloads suspended therefrom is better able to see where a payload is being released under all types of light conditions.

Finally, another object of the present invention is to provide methods and apparatus as discussed above, in which the payloads and apparatus can be selectively or collectively dropped, such as in an emergency situation.

To achieve the forgoing objects, and in accordance with the invention as embodied and broadly described herein, a payload management system is provided for selectively attaching and selectively releasing multiple payloads suspended from an aircraft. The payload management system comprises a frame assembly for carrying multiple payloads and a sling assembly that extends from a helicopter or other vertical lift aircraft to the frame assembly.

The sling assembly includes a load bearing cable having a first end and a second end. The load bearing cable is preferably made from a multi-strand, stainless steel cable or a cable of composite material. In one embodiment, the first end of the load bearing cable is attached to a cargo hook at the base of a helicopter. In the preferred embodiment, however, a stress sensor is positioned so as to extend between the helicopter and the first end of the load bearing cable. The stress sensor includes a load cell that can be used for determining the weight of the payloads carried by the helicopter.

The sling assembly further comprises a payload hook and an anti-torque device. The anti-torque device is positioned so as to extend between the second end of the load bearing cable and the payload hook. The anti-torque device comprises a rotor assembly interconnected with a stator assembly such that the rotor assembly can rotate relative to the longitudinal axis of the load bearing cable. The ability of the rotor assembly to rotate helps to eliminate torsional forces on the load bearing cable and helicopter.

The payload hook is attached to the rotor assembly and is electrically actuated for selectively attaching and releasing the frame assembly attached thereto. In an alternative embodiment, the sling assembly can be used without the frame assembly. In such an embodiment, the payload hook is used to selectively attach and release a single payload attached thereto.

The frame assembly includes an airframe capable of supporting multiple payloads. In the preferred embodiment, the airframe comprises a loading frame, a support frame, and a plurality of struts extending from the loading frame to the support frame. A plurality of payload hooks are attached to the airframe. The payload hooks are electrically actuated for selectively attaching and releasing individual payloads attached thereto.

In one embodiment, a plurality of legs are attached to and extend below the airframe such that the plurality of legs support the payload hooks off the ground. Furthermore, a stabilizing wing is attached to the airframe so as to be vertically oriented and aligned with the longitudinal axis of the airframe. The stabilizing wing when acted upon by the flow of air from the forward motion of the helicopter prevents or reduces the airframe from rotating during suspended flight. In the preferred embodiment, load cells extend between the airframe and each of the payload hooks so as to permit weighing of each of the payloads attached to the payload hooks.

To permit communication between the helicopter and each of the payload hooks and load cells, electrical cables are positioned along the length of the sling assembly and frame assembly. Electrical signals are passed between the rotor assembly and stator assembly through mechanisms such as slip rings and brushes or through the use of a co-axial optical coupler. If a co-axial optical coupler is used, a logic circuit box is attached to the airframe for processing serial signals from the helicopter and subsequently transmitting electrical currents to the selected payload hooks and/or load cells. A stator transmit coil and rotor pickup coil can be positioned on opposing sides of the rotor and stator assembly so as to provide a current for energizing the logic circuit box. In yet another embodiment, a logic circuit board can be positioned within the rotor assembly for processing electrical impulse signals from the co-axial optical coupler and selectively energizing the payload hook attached to the anti-torque device.

These and other objects and features of the present invention will become more fully apparent from the following description and appended claims, or may be learned by the practice of the invention, as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawing depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
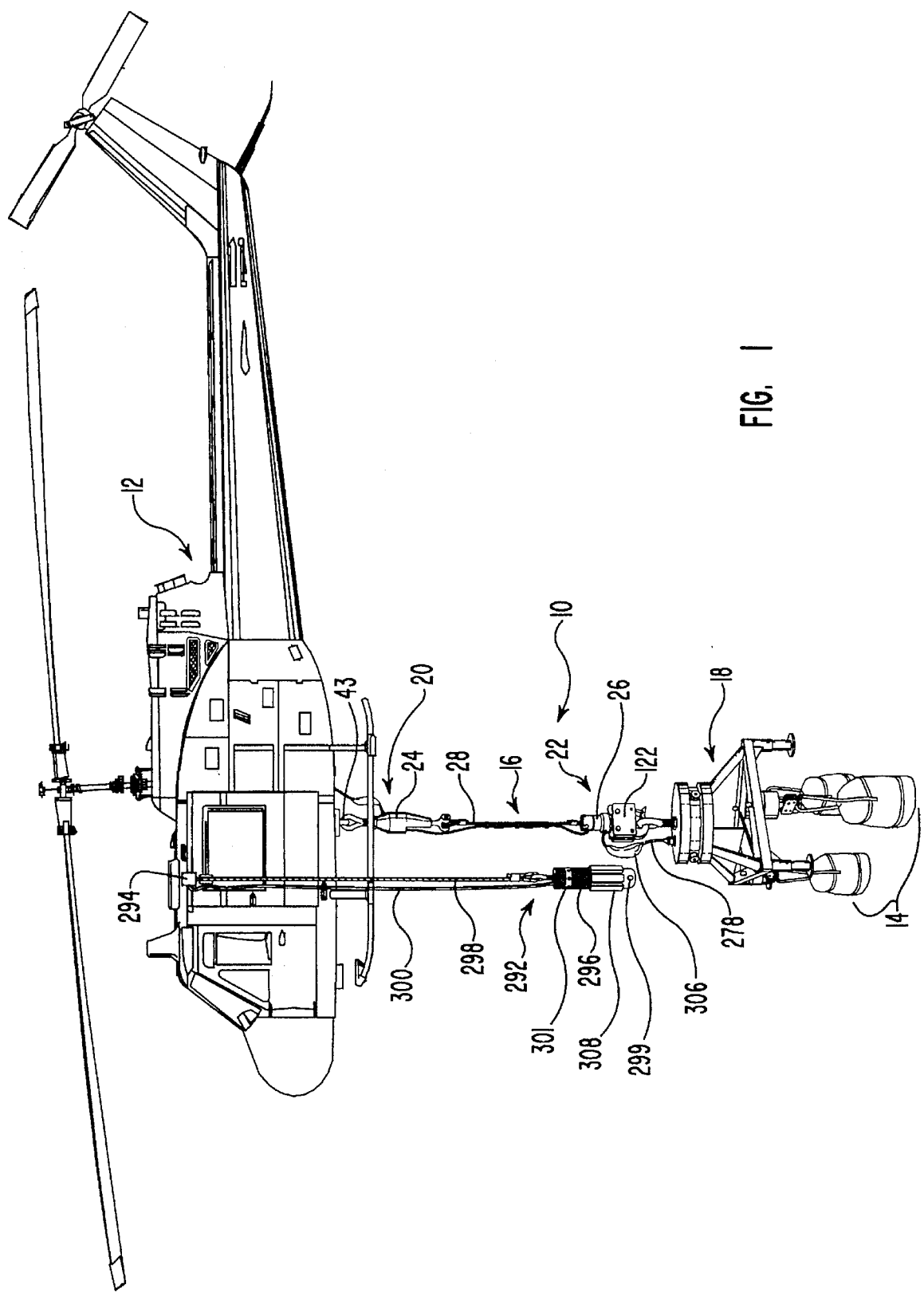
FIG. 1 is a perspective view of a multiple payload cargo system suspended from an aircraft and carrying multiple payloads.

FIG. 1 depicts a multiple payload system 10 suspended from a helicopter 12 and carrying payloads 14. Although payload system 10 is shown suspended from helicopter 12, the present invention can be used in combination with other aircraft that are capable of vertical take-off and landing.

Payload system 10 comprises a sling assembly 16 and a frame assembly 18. FIG. 1 depicts sling assembly 16 having a first end 20 attached to helicopter 12 and having a second end 22 attached to frame assembly 18. In an alternative embodiment, where it is desirable only to carry a single payload, second end 22 of sling assembly 16 can be directly connected to a payload 14 without using frame assembly 18.

Figure 2:
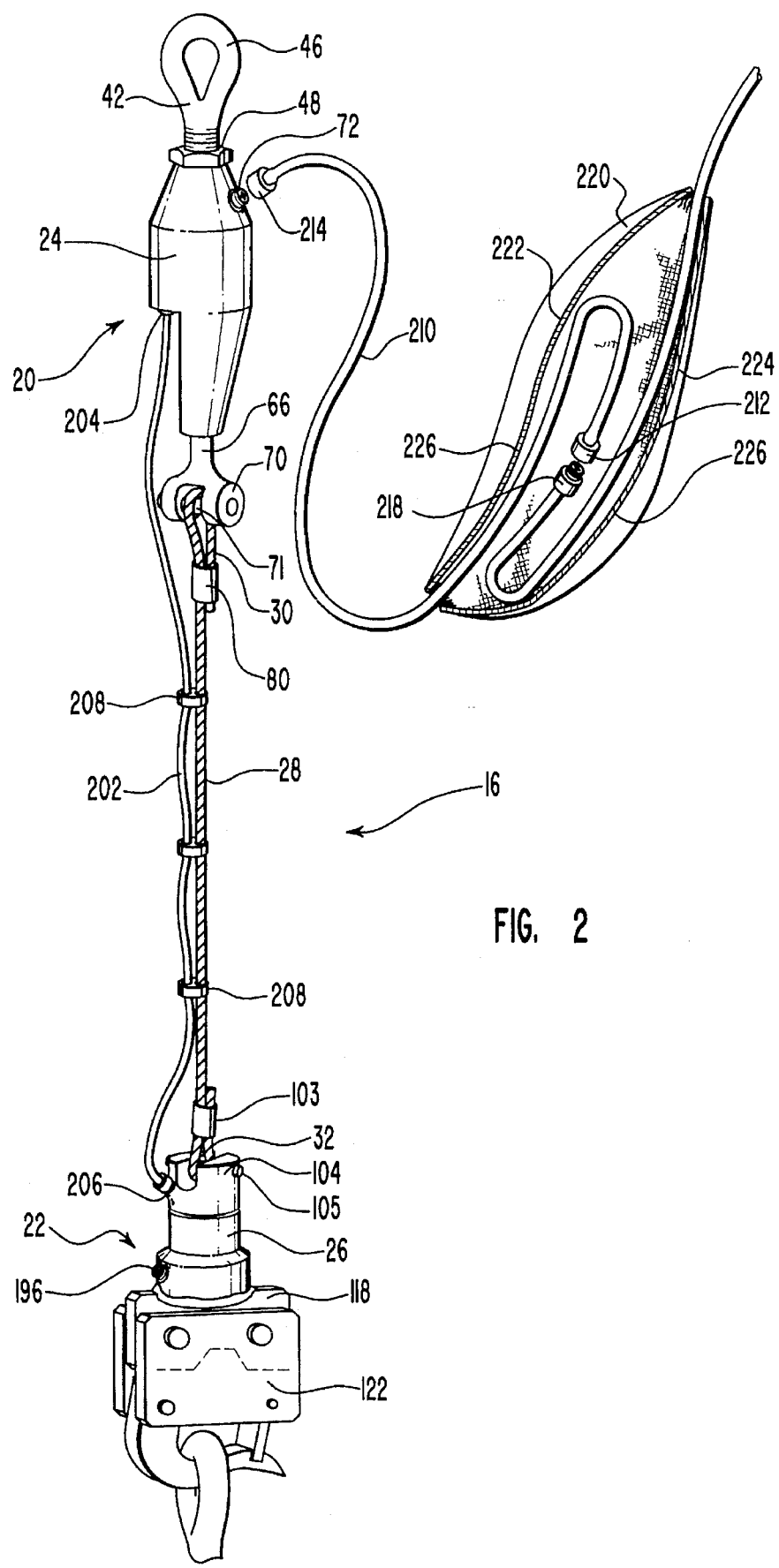
FIG. 2 is a perspective view of a sling assembly including a payload stress sensor, a load bearing cable, an anti-torque device, and a hook assembly.

FIG. 2 is an enlarged perspective view of sling assembly 16. As shown therein, sling assembly 16 comprises a payload stress sensor 24 at first end 20 and an anti-torque device 26 located at second end 22. Extending between payload stress sensor 24 and anti-torque device 26 is a load bearing cable 28 having a first end 30 and a second end 32.

Figure 3:
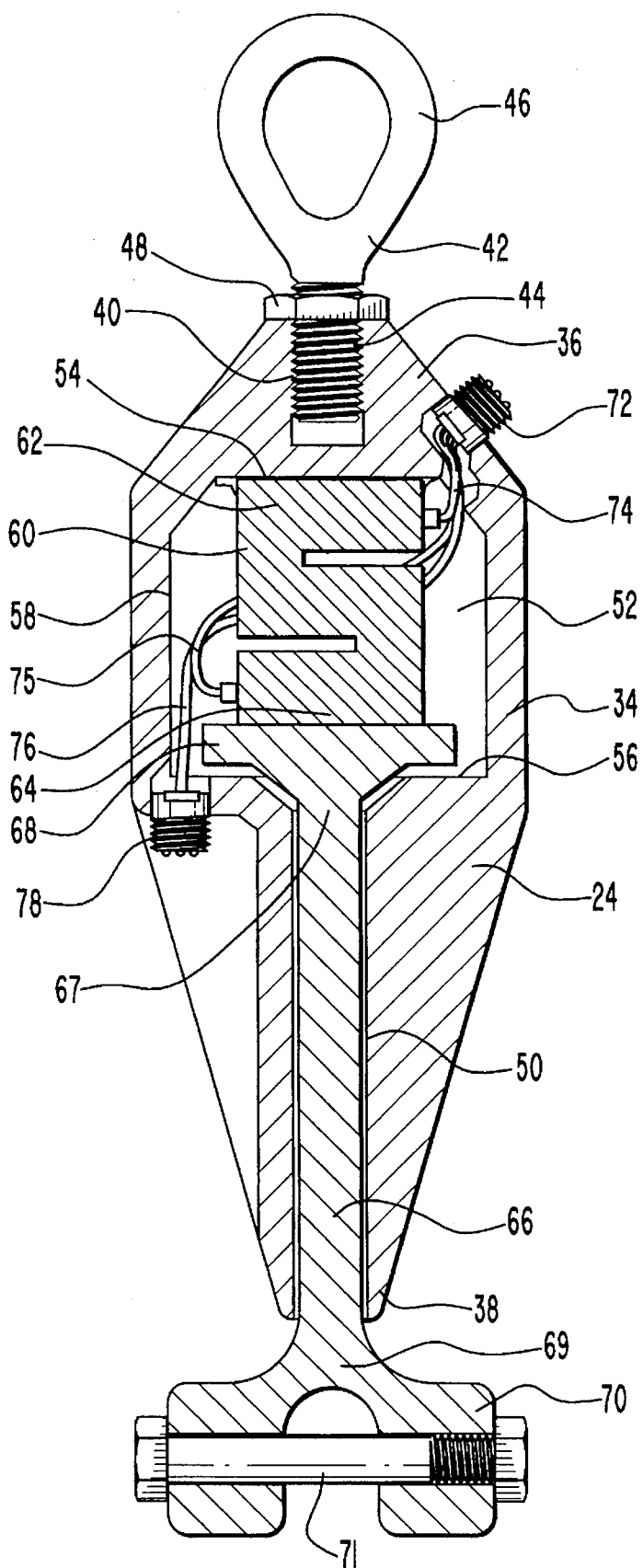
FIG. 3 is a cross-sectional view of the payload stress sensor shown in FIG. 2.

In one embodiment of the present invention, first end 30 of load bearing cable 28 is directly connected to helicopter 12 thereby eliminating stress sensor 24. Alternatively, in accordance with one aspect of the present invention, means are provided for weighing payloads 14 when suspended from an aircraft. By way of example and not by limitation, payload stress sensor 24 is depicted in FIG. 3 having a housing 34 with a first end 36 and a second end 38. Located at first end 36 is a threaded bore 40. An eyelet 42 having a threaded end 44 and an annular end 46 is attached to housing 34 by threaded engagement between threaded end 44 and threaded bore 40. To secure eyelet 42 at a selected orientation, a nut 48 is threaded onto threaded end 44 and biased against first end 36 of housing 34.

Eyelet 42 functions as a mechanism for attachment to helicopter 12. For example, a hook 43 can be attached to the base of helicopter 12. Hook 43 can then attach to annular end 46 of eyelet 42. Of course any of a number of types of connections known in the art, i.e., sockets, latches, straps, threaded connections, or other types of connections, can be used for attaching housing 34 to Helicopter 12.

Located at second end 38 of housing 34 is a passage 50 that feeds to a chamber 52 located within housing 34. Chamber 52 is defined by a top wall 54, bottom wall 56, and side walls 58. Passage 50 enters chamber 52 through bottom wall 56. Slidably positioned within passage 50 is a rod 66 having a first end 67 and a second end 69. First end 67 is positioned within chamber 52 while second end 69 is positioned outside of housing 34. Located within chamber 52 is a load cell 60 having a first end 62 attached to top wall 54 and a second end 64 attached to first end 67 of rod 66. In this embodiment, housing 34 acts in part as a protective cover for load cell 60.

In the preferred embodiment, as shown in FIG. 3, a flange 68 having a diameter larger than the diameter of passage 50 is connected between first end 67 of rod 66 and second end 64 of load cell 60. As a result, if load cell 60 fails, flange 68 becomes biased against bottom wall 56, thereby transferring the load to housing 34. This configuration prevents loss of payload 14 as a result of failure of load cell 60.

The present invention also provides means for weighing a payload when suspended from an aircraft. By way of example and not by limitation, attached to opposing sides of housing 34 is electrical connection 72 and electrical connection 78. Electrical cables 74 and 75 extend respectively from electrical connection 72 to first end 62 of load cell 60 and second end 64 of load cell 60. As a load is applied to rod 66, a stress is transferred to load cell 60. The resulting strain on load cell 60 changes the electric current flow delivered by electrical cables 74 and 75 to load cell 60. In turn, the change in current can be measured by a logic circuit (not shown) in helicopter 12 to determine the force or weight applied to rod 66, thereby determining the weight of the payloads attached thereto. There are numerous types of load cells common in the art that can be used. One preferred type of load cell is the "S"-Cell Model No. BPS from Revere Transducers, Calif. An electrical cable 76 also extends from electrical connection 72 through housing 34 to electrical connection 78. The purpose of electrical cable 76 will be discussed later in the disclosure.

Payload stress sensor 24 is preferably made from stainless steel to provide high strength and prevent rusting. However, stress sensor 24 and the various components can be made of a variety of material, e.g., high strength aluminum, ceramics, composite, or other conventional materials well known in the art. The size of stress sensor 24 and the materials it is made of depends on the loads to be carried and the environment to be used in.

Returning again to FIG. 2, load bearing cable 28 is shown extending between payload stress sensor 24 and anti-torque device 26. Positioned at second end 69 of rod 66 is a clevis 70 having a suspended pin 71. First end 30 of load bearing cable 28 is attached to clevis 70 by looping first end 30 over pin 71 and crimping first end 30 back onto itself with a metal tie 80. Of course, any number of well known methods can be used to connect cable 28 to stress sensor 24, e.g., clamping, welding, screwing, coupling, tieing, or any other method known in the art. In one embodiment, load bearing cable 28 is a multi-stand, stainless steel cable capable of supporting a weight in a range between about 1,000 kg to about 10,000 kg. Alternatively, cable 28 can made from other types of metals or from webbing or rope made from nylon, composite, or other types of material depending on the intended use.

The length of load bearing cable 28 is dependent on the intended use of the system. Typically, cable 28 must be of sufficient length so that a helicopter can lower frame assembly 18 or a payload 14 attached to payload hook 122 to the ground for releasing or attaching payloads thereto without endangering helicopter 12 by surrounding objects such as trees or buildings. Alternatively, load bearing cable 28 should not be so long that the payload strikes grounded objects during normal flights of helicopter 12. It is envisioned that cable 28 will have a length in a range between about 3 meters to about 40 meters.

Figure 4:
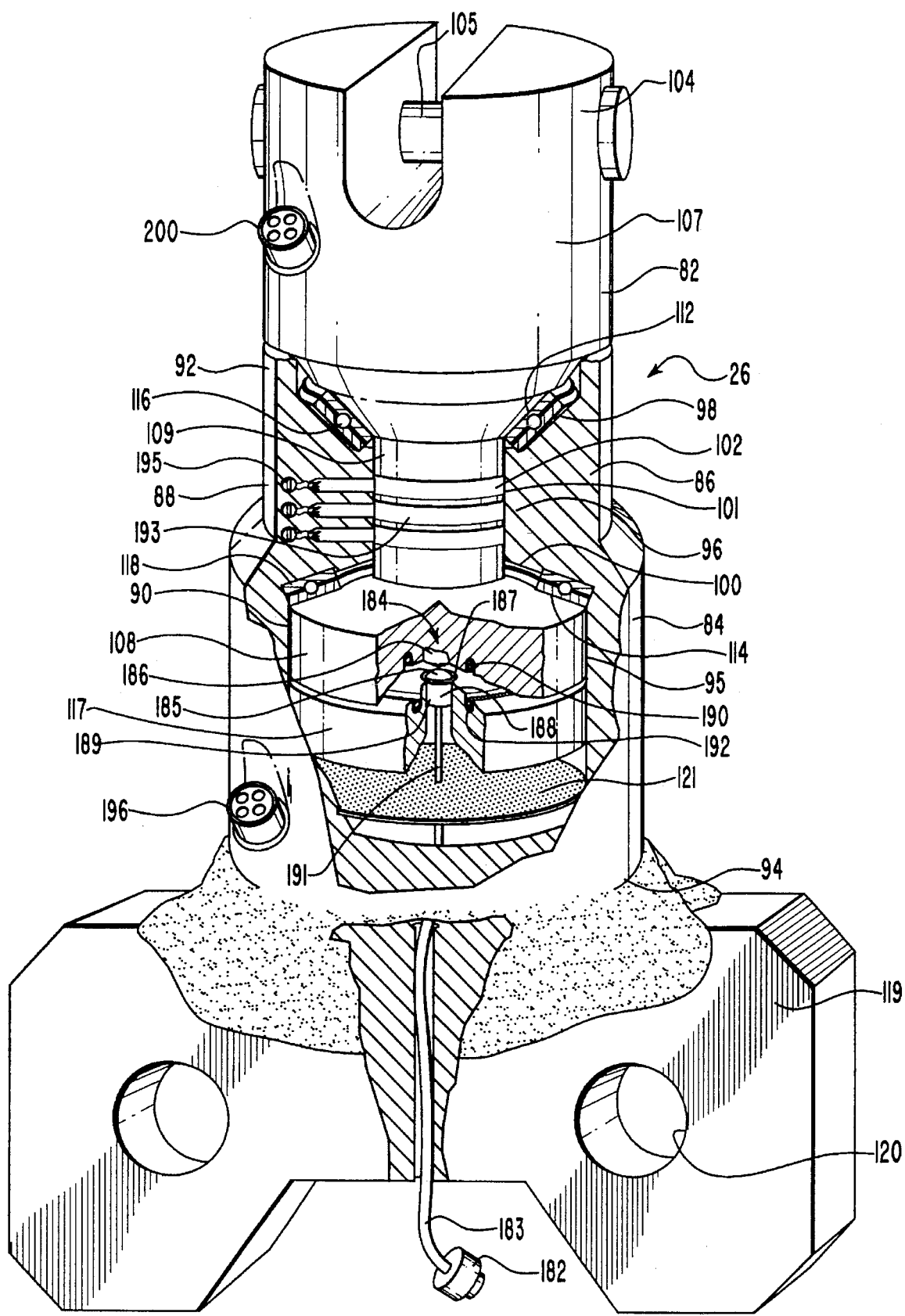
FIG. 4 is a cutaway view of the anti-torque device shown in FIG. 2.

In accordance with one aspect of the present invention, means are provided for attaching second end 32 of load bearing cable 28 to a payload hook such that the payload hook freely rotates relative to the longitudinal axis of load bearing cable 28. By way of example and not by limitation, FIG. 4 shows an enlarged, cut-away view of anti-torque device 26 having a stator assembly 82 interconnected with a rotor assembly 84.

Rotor assembly 84 comprises a substantially cylindrical housing 86 having an exterior surface 88, an interior surface 90, a first end 92 and a second end 94. Interior surface 90 defines a substantially cylindrical receiving chamber 95 positioned within rotor assembly 84. Positioned near first end 92 and extending radially inward from interior surface 90 is a lip 96. Lip 96 is defined by a first shoulder 98 and a second shoulder 100, shoulders 98 and 100 complementary sloping to a cap 102. Cap 102 defines a passage 101 leading to receiving chamber 95.

Stator assembly 82 comprises a first shaft 107, a second shaft 108, and a third shaft 109. Third shaft 109 is longitudinally aligned with and extends between first shaft 107 and second shaft 108. First shaft 107 has a clevised end 104 having a pin 105. As shown in FIG. 2, second end 32 of load bearing cable 28 is attached to clevised end 104 by looping second end 32 over pin 105 and crimping second end 32 back onto itself with a metal tie 103.

Returning again to FIG. 4, second shaft 108 is positioned within receiving chamber 95 while third shaft 109 extends through passage 101. Second shaft 108 has a diameter greater than the diameter of passage 101 so that second shaft 108 is held within receiving chamber 95. Extending between first shaft 107 and third shaft 109 is a first shoulder 112 having a slope complementary to the slope of first shoulder 98 of lip 96. Likewise, extending between second shaft 108 and third shaft 109 is a second shoulder 114 having a slope complementary to the slope of second shoulder 100 of lip 96.

To permit free rotation between stator assembly 82 and rotor assembly 84, a first bearing assembly 116 is secured between first shoulder 98 and first shoulder 112. A second bearing assembly 118 is likewise secured between second shoulder 100 and second shoulder 114. Bearing assembles 116 and 118 support and separate stator assembly 82 from rotor assembly 84. By having the various shoulders sloping, bearing assembles 116 and 118 are able to resist both horizontal and vertical forces. Bearing assemblies 116 and 118 preferably comprise conventional thrust bearings which are best able to function under heavy loads. However, depending on the required loads, alternative bearings can be used, such as ball bearings or needle bearings.

In one embodiment, a base plate 117 is secured within receiving chamber 95 so as to be aligned with and positioned between second shaft 108 and second end 94 of rotor assembly 84. Likewise, a logic circuit panel 121 is positioned within receiving chamber 95 so as to be positioned between base plate 117 and second end 94 of rotor assembly 84. Base plate 117 and logic circuit panel 121 will be discussed later in greater detail.

Attached to second end 94 of cylindrical housing 86 is a mounting plate 119. Mounting plate 119 is preferably a thin, rectangular plate that is welded to second end 94, although any conventional attachment means can be used. A plurality of passages 120 are shown passing through mounting plate 119. As shown in FIG. 2, passages 120 are used for attaching payload hook 122 onto mounting plate 119.

Figure 5A:
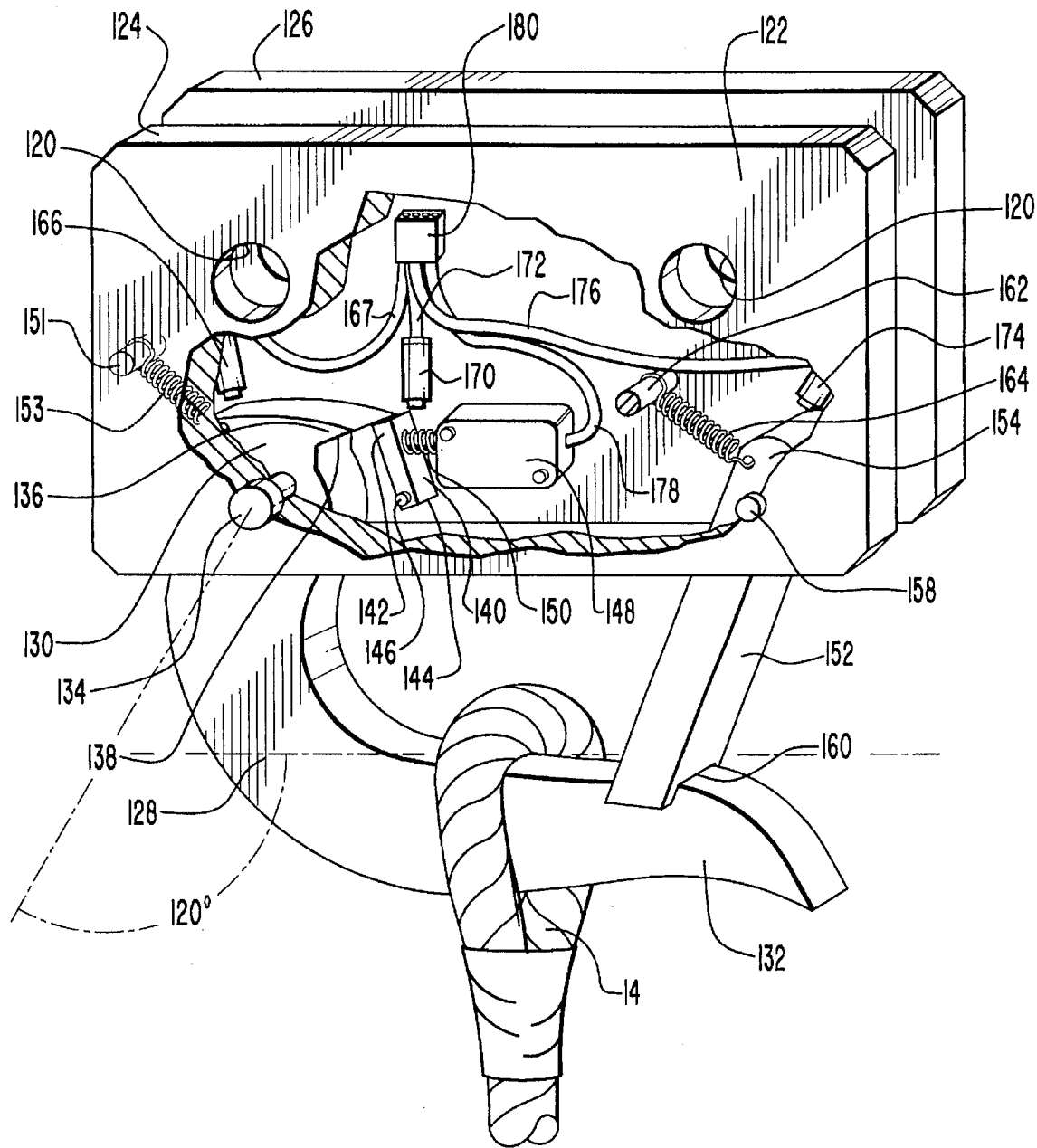
FIG. 5A is a cutaway view of a payload hook including magnetic proximity detectors in a loading position.

FIG. 5A depicts an enlarged view of payload hook 122 comprising a first side plate 124 and a second side plate 126 positioned adjacent to first side plate 124. A hook arm 128 having a first end 130 and a second end 132 is positioned between side plates 124 and 126. Hook arm 128 is held in position by a pin 134 extending through side plates 124 and 126 and through hook arm 128 near first end 130. Hook arm 128 is secured so as to be capable of rotating about pin 134. Extending from first end 130 of hook arm 128 is a lip 136 having a load bearing surface 138. Positioned adjacent to lip 136 is a latch 140 having a first end 142 and a second end 144. Latch 140 is cable of rotating about a pin 146 attached at opposing ends to side plates 124 and 126 extending through second end 144 of latch 140.

Figure 5B:
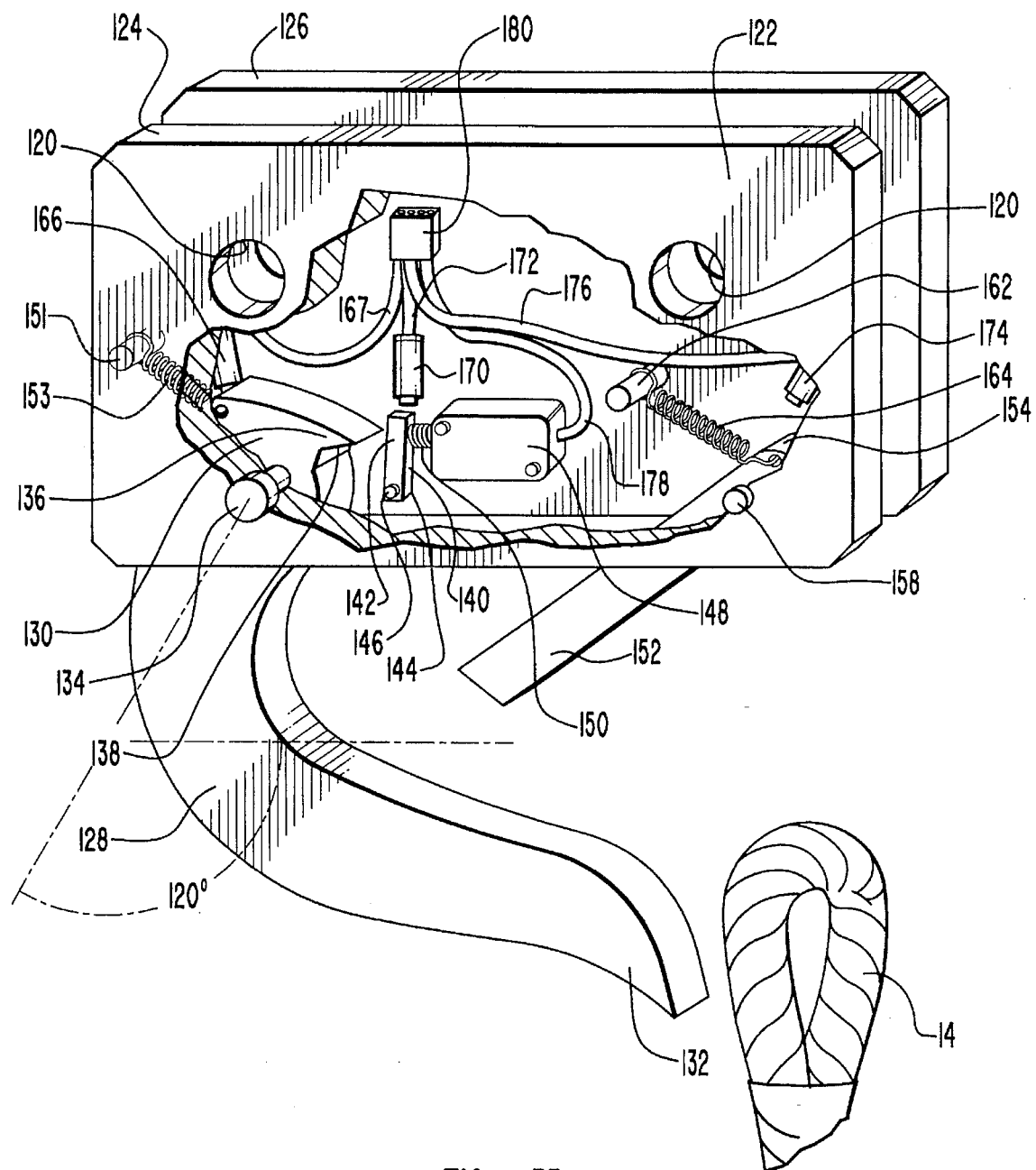
FIG. 5B is a cutaway view of a payload hook including magnetic proximity detectors in an unloading position.

As can be seen by the contrast between FIGS. 5A and 5B, payload hook 122 can be selectively positioned into a loading position, as shown in FIG. 5A, or an unloading position, as shown in FIG. 5B. In the loading position, a piston 150 actuated by a solenoid 148 is extended so as to bias first end 142 of latch 140 against load bearing surface 138 of lip 136, thereby preventing rotation of hook arm 128 when payload 14 is attached thereto. In the unloading position, solenoid 148 is actuated so as to retract piston 150 and latch 140. As a result, with payload hook 122 in the unloading position, hook arm 128 freely rotates under the force of payload 14 loaded onto hook arm 128, thereby releasing payload 14. Payload hook 122 is preferably designed so that hook arm 128 is capable of rotating 120°. The ability for wide rotation eliminates the chance that payload 14 will get hung-up on hook arm 128.

To return hook arm 128 to the loading position, a pin 151 is positioned adjacent to first end 130 of hook arm 128. A spring 153 extends between pin 151 and first end 130 of hook arm 128. Pin 151 is so positioned that when hook arm 128 is rotated for unloading, spring 153 is extended so as to apply sufficient force to retract hook arm 128 once payload 14 has been released.

Further disclosed in FIGS. 5A and 5B is a safety latch 152 having a first end 154 and a second end 156. Positioned between first end 154 and second end 156 is a pin 158 that extends through safety latch 152 and attaches at opposing ends to side plates 124 and 126. Safety latch 152 is attached to pin 158 so as to permit rotation of safety latch 152 about pin 158. Second end 156 of safety latch 152 has a groove 160 sized to receive second end 132 of hook arm 128. Hook arm 128 and safety latch 152 are so positioned that when hook arm 128 is in the loading position, second end 156 of safety latch 152 is biased against second end 132 of hook arm 128.

To maintain safety latch 152 biased against hook arm 128, a pin 162 is positioned adjacent to first end 154 of safety latch 152 with a spring 164 extending between pin 162 and first end 154 of safety latch 152. Pin 162 is positioned so as continually bias safety latch 152 against hook arm 128 in the loading position.

When payload hook 122 is in the loading position, safety latch 152 can be manually rotated toward first end 130 of hook arm 128 as shown in FIG. 5B to permit manual loading and unloading of payload 14. However, as a result of safety latch 152 being biased against hook arm 128, safety latch 152 prevents payload 14 from accidentally being released from hook arm 128 until payload hook 122 is moved into the unloading position.

In one embodiment of the present invention, means are provided for determining the loading position of payload hook 122. By way of example and not by limitation, depicted in FIG. 5A is a first proximity detector 166 positioned adjacent to first end 130 of hook arm 128. First proximity detector 166 is attached to an electrical cable 167 which extends to an electrical connection 180 housed within payload hook 122. Proximity detector 166 is so positioned that when hook arm 128 is in the loading position, proximity detector 166 is activated. As will be discussed later in greater detail, with proximity detector 166 activated, an electrical signal can be sent through electrical cable 167 to inform those in helicopter 12 that hook arm 128 is in the loading position. Likewise, when hook arm 128 is in the unloading position, proximity detector 166 is not activated.

A second proximity detector 170 is positioned adjacent to latch 140. Proximity detector 170 is selectively activated and inactivated as latch 140 is pivoted between the loading and unloading positions. When activated, an electrical signal is sent on electrical cable 172 to identify those in helicopter 12 the position of latch 140. Finally, a third proximity detector 174 is positioned adjacent to first end 154 of safety latch 152. As safety latch 152 is rotated between the loading and unloading position, third proximity detector 174 is selectively activated and inactivated. When activated, an electrical signal is sent on electrical cable 176 to notify those in helicopter 12 the position of safety latch 152.

Any number of different types of proximity detectors can be used. One preferred type of proximity detector is the Inductive Analog Proximity Sensor which can be purchased from Electromatic A Carlo Gavazzi Group Corporation. Proximity detectors 166, 170, and 174 can be oriented in a variety of positions so long as they are selectively activated as the components which they are individually monitoring are moved between the loading and unloading position.

The present invention also discloses means for electrically and selectively actuating payload hook 122 from an aircraft. To accomplish this end, electrical cables and electrical connections are disposed so as to extend between helicopter 12 and payload hook 122. By way of example and not by limitation, as previously discussed, solenoid 148 is positioned to permit hook arm 128 to selectively open and close.

Solenoid 148 is energized by electrical cable 178 which extends from Solenoid 148 to electrical connection 180. In turn, electrical connection 180 is coupled with electrical cable 183 via electrical connection 182 shown in FIG. 4. Electrical cable 183 extends from electrical connection 182 to rotor assembly 84.

The present invention further provides means for transferring an electrical signal between stator assembly 82 and rotor assembly 84. By way of example and not by limitation, a co-axial optical coupler 184 is depicted in FIG. 4. Co-axial optical coupler 184 comprises a first end 186 and a second end 188. First end 186 is recessed within second shaft 108 of stator assembly 82 along the longitudinal axis of stator assembly 82. Second end 188 of optical coupler 184 is recessed within base pate 117 so as to be adjacent to and aligned with first end 186.

First end 186 and second end 188 each comprise an exposed infrared emitting diode 185 surrounded by a receiving lens 187. During operation, electrical impulse signals are sent from helicopter 12 to first end 186. The emitting diode 185 converts the electrical signals into pulses of light. The light then travels to receiving lens 187 on second end 188 where the light is directed by reflection to a phototransistor detector 189 which converts the light back to electrical impulse signals. Infrared emitting diode 185 has a 90° beam angle which allows for about a one centimeter separation between opposing ends of co-axial optical coupler 184.

The electrical impulse signals travel from second end 188 of co-axial optical coupler 184 along an electrical cable 191 to logic circuit panel 121. Logic circuit panel 121 processes the signals and in turn selectively sends an electrical current along electrical cable 183 to energize solenoid 148. Logic circuit panel 121 also determines when the proximity detectors 166, 170, and 174 are activated. In turn, logic circuit panel 121 transmits electrical signals back through co-axial optical coupler 184 to helicopter 12, thereby identifying the loading position of payload hook 122.

Logic circuit panel 121 can be designed by those skilled in the art based upon the operating functions as disclosed herein. To energize logic circuit panel 121, the electrical cables disclosed herein are capable of carrying both electrical signals and electrical current. Means are also provided to transfer an electrical current from stator assembly 82 to rotor assembly 84. As shown in FIG. 4, by way of example and not by limitation, a stator transmit coil 190 is recessed within second shaft 108 of stator assembly 82 so as to encircle first end 186 of co-axial optical coupler 184. Positioned adjacent to stator transmit coil 190 and encircling second end 188 of co-axial optical coupler 184 on base plate 117 is a rotor pick-up coil 192.

Stator transmit coil 190 and rotor pick-up coil 192 are preferably donut shaped and so positioned that when rotor assembly 84 rotates with respect to stator assembly 82, an electrical current passed through stator transmit coil 190 is able to produce an electrical current in rotor pick-up coil 192. The electrical current is then carried to logic circuit panel 121 for energizing thereof.

The above-discussed co-axial optical coupler design allows for the unrestricted rotation of rotor assembly 84 relative to stator assembly 82 without loss of bidirectional signal processing. Alternative means for transferring an electrical signal between stator assembly 82 and rotor assembly 84 includes replacing co-axial optical coupler 184 with opposing insulated, capacitative plates. By having metal plates positioned adjacent to each other, electrical signals or charges can be passed between plates without the plates actually touching. In yet another embodiment, inductive transfer coils similar to stator transmit coil 190 and rotor pick-up coil 192 can be positioned between stator assembly 82 and rotor assembly 84. By insulating and providing filters between the signal transfer coils and the current transfer coils, and by having varied frequencies between the different types of coils, electrical signals can be passed between the signal transfer coils.

As also depicted in FIG. 4, an alternative means for transferring an electrical signal between stator assembly 82 and rotor assembly 84 comprises slip rings 193 encircling third shaft 109. Connected to lip 96 and aligned with slip rings 193 are brush contacts 195. The connection between slip rings 193 and brush contacts 195 permits transfer of an electrical signal between stator assembly 82 and rotor assembly 84.

Co-axial optical coupler 184 and slip rings 193 are in turn electrically connected to electrical connection 200 mounted on the exterior of first shaft 107 of stator assembly 82. As further depicted in FIG. 2 extending between electrical connection 200 and electrical connection 78 along load bearing cable 28 is an electrical cable 202. Electrical cable 202 has an electrical connection 204 coupled with electrical connection 78 and an electrical connection 206 coupled with electrical connection 200. Ties 208 support electrical cable 202 against load bearing cable 28 to prevent electrical cable 202 from flapping in the wind and accidentally disconnecting the electrical connections.

As previously discussed with regard to FIG. 3, electrical connection 78 is connected to electrical connection 72 via electrical cable 76. Finally, all of the electrical signals and currents emanate from helicopter 12 and are transferred to sling assembly 16 via electric cable 210 extending from helicopter 12 to electrical connection 72 on stress sensor 24. Control cable 210 is connected within helicopter 12 to a power source, a logic circuit, and a control panel (not shown). Control cable 210 has an electrical connector 214 for coupling with electrical connection 72 on stress sensor 24.

Based on the above discussed assembly, electrical signals can be transferred from helicopter 12 to payload hook 122 for selectively actuating payload hook 122. Similarly, the same cable assembly can be used for controlling proximity detectors 166, 170, and 174 within payload hook 122 and for operating load cell 60. The electrical cable used herein is multi-conductor copper cable. The electrical cable and electrical connections are conventional and can be purchased from Beldon Cable.

In the preferred embodiment as shown in FIG. 2, control cable 210 has an emergency break defined by the coupling of electrical connections 212 and 218 along control cable 210. In the preferred embodiment, cable 210 is positioned into an "S" configuration with connectors 212 and 218 located at the center of the "S." A bag 220, preferably made of nylon, is positioned so as to tightly cover cable 210 in the "S" configuration.

Bag 220 is designed having a first edge 222 and a second edge 224. Bag 220 is held closed by a Velcro strap 226 attached to edges 222 and 224 of bag 220. Bag 220 is constructed such that a load below about 7 kg applied to control cable 210, bag 220 will not open and connections 212 and 218 will not separate. However, for loads above about 7 kg, such as when the sling assembly 16 is released, bag 220 will open and connections 212 and 218 automatically separate.

In the preferred embodiment as shown in FIG. 1, hook 43 attached to the base of helicopter 12 is similar in design to payload hook 122. In this embodiment, hook 43 can be selectively actuated so as to release sling assembly 16 on command, thereby necessitating the need for the breakaway configuration of control cable 210 as discussed above.

Sling assembly 16 can be used independently to selectively attach, carry, and release payloads. With sling assembly 16 secured to the base of helicopter 12, a payload is manually attached to payload hook 122. The payload can then be carried to the desired destination and either automatically released, even while still suspended in air, by transmitting an electrical current form helicopter 12 that will activate payload hook 122, or helicopter 12 can lower the payload to the ground and the payload can be manually removed.

Figure 6:
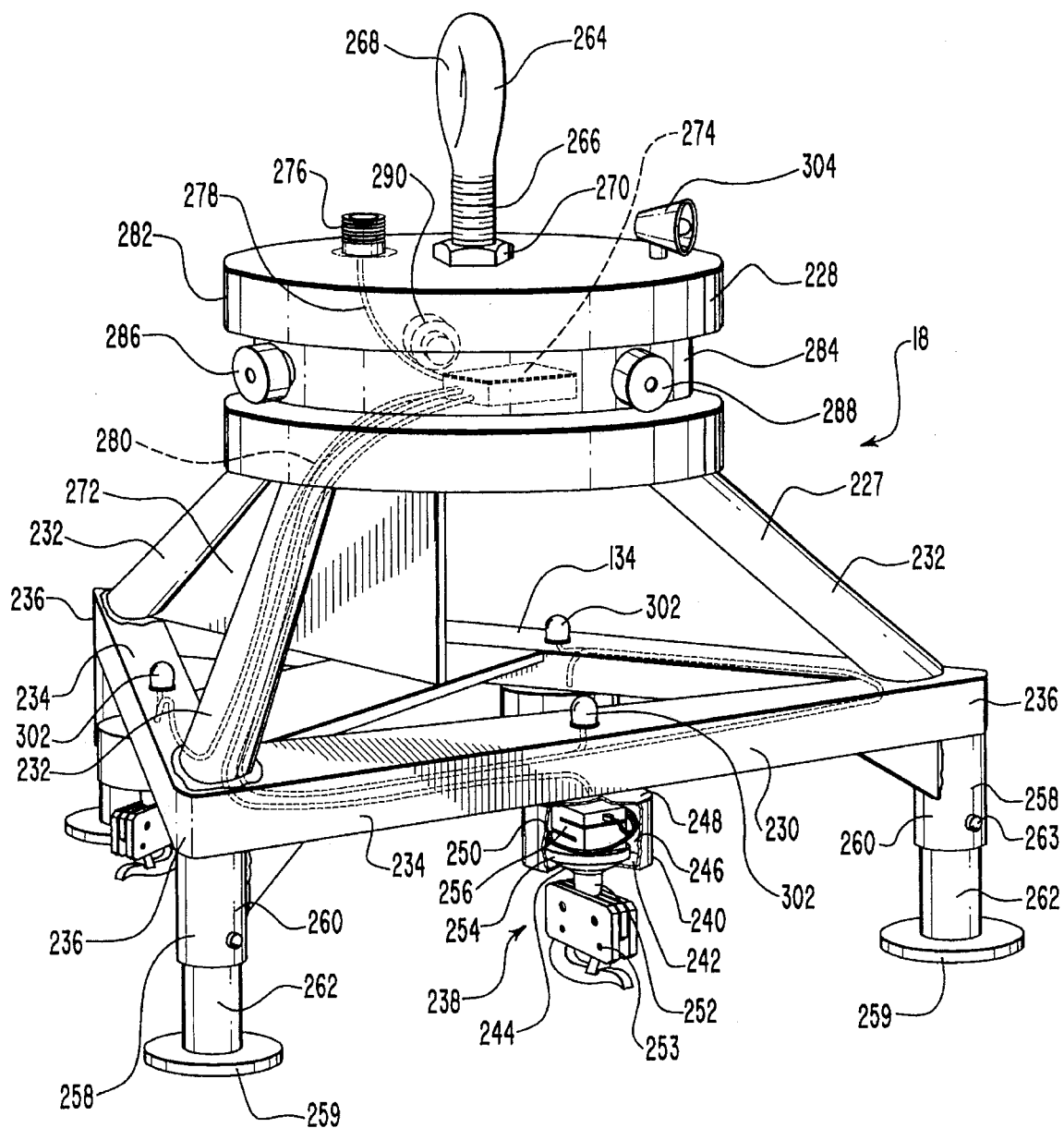
FIG. 6 is a perspective view of an airframe having multiple payload hooks and a wing stabilizer.

In one embodiment, as shown in FIG. 1, it may be desirable to carry and release multiple payloads. To accomplish this end, frame assembly 18 is connected to payload hook 122. As depicted in FIG. 6, frame assembly 18 includes an airframe 227 defined by a loading frame 228, a support frame 230, and a plurality of struts 232 extending from loading frame 228 to support frame 230. Support frame 230 is shown having three sides 234 intersecting at three corners 236. In alternative embodiments, support frame 230 can be designed to have any number of a plurality of sides. For example, support frame 230 can be formed into the shape of a square, pentagon, octagon, or hexagon. Likewise, support frame 230 can be circular.

Attached below the middle of each side 234 is hook assembly 238. Hook assembly 238 comprises a housing 240 having a base plate 242 with a passageway 244 extending therethrough into a chamber 246 positioned within housing 240. Chamber 246 is defined by a top plate 248, side walls 250 and base plate 242. Positioned within passageway 244 is a rod 252 having a flanged end 254 positioned within chamber 246. Attached to the opposing end of rod 252 is a payload hook 253 configured substantially similarly to payload hook 122, previously discussed. Payload hooks 122 and 253 are each preferably capable of carrying payloads greater than about 100 kg.

Extending between top plate 248 and flanged end 254 of rod 252 is a load cell 256. As previously discussed with regard to load cell 60, rod 252 is freely suspended from load cell 256 so as to enable measuring the weight of each individual payload attached to payload hook 253. Furthermore, flanged end 254 preferably has a diameter greater than the diameter of passageway 244 so that if load cell 256 fails, the weight of payload 14 will be transferred to base plate 242.

Airframe 227 can be designed to carry from between about 2 to about 16 payload hooks 253. Airframe 227 designed to carry less than about 5000 kg is preferably made of 6061 series aircraft aluminum extrusions to provide the maximum strength, low weight, and environmental resistance. Airframe 227 designed to carry more than about 5000 kg is preferably made of 316 stainless steel. Alternatively, airframe 227 can be made of Kevlar fiber reinforced plastic or other composites. Airframe 227 will also preferably be able to carry at least 4 times the combined load rating of all hook assemblies 238. Environmental resistance is further enhanced by the application of powder-fused paint on airframe 227 fabricated of metal.

The present invention also provides means for supporting the plurality of payload hooks a distance off the ground during repetitive landing of frame assembly 18. By way of example and not by limitation, vertically extending from corners 236 are legs 258 having feet 259. In one embodiment, each leg 258 comprises a hollow tube 260 having a rod 262 inserted therein. A pin 263 is positioned between both tube 260 and rod 262 to permit selective adjustment on the height of legs 258. Of course, there are numerous types of legs which could be used for selectively adjusting the height. For example, legs 258 could be telescopic or they could have components that selectively screw together to adjust the height.

The present invention further provides means for suspending airframe 227 at a distance below an aircraft. By way of example and not by limitation, attached to loading frame 228 is an eyelet 264 having a threaded end 266 screwed into loading frame 228 and an annular end 268 for attachment to payload hook 122. A nut 270 is threaded onto threaded end 266 and biased against loading frame 228 to securely hold eyelet 264 at a desired orientation. Alternatively, means for suspending airframe 227 could comprise a number of different types of straps, annular objects, or latches that could attach to payload hook 122. To assist in releasing frame assembly 18 from payload hook 122, electrical cable 278 is preferably designed having an emergency break similar to control cable 210 which is enclosed by a bag 306 similar to bag 220.

Furthermore, the present invention provides means for retarding rotation of airframe 227 during suspended flight of airframe 227. By way of example and not by limitation, a stabilizing wing 272 is attached in a vertical orientation extending from strut 232 to the longitudinal axis extending through airframe 227. Alternatively, stabilizing wing 227 can be located at any location on airframe 227, including beneath airframe 227, as long as stabilizing wing 272 is oriented so as to be radially aligned with the longitudinal axis of airframe 227.

In the preferred embodiment, means are also provided for electrically and selectively actuating each of payload hooks 253. By way of example and not by limitation, FIG. 6 depicts a logic circuit box 274 positioned within loading frame 228 which is electrically connected to an electrical connection 276 mounted on loading frame 228. An electrical cable 278, as shown in FIG. 1, extends between electrical connection 276 and electrical connection 196 on anti-torque device 26. Furthermore, a plurality of electrical cables 280 extend from logic circuit box 274 to each of the hook assemblies 238.

In this configuration, logic circuit box 274 receives and processes serial inputs transmitted through co-axial optical coupler 184. Depending on the processed signal, logic circuit box 274 transmits an electrical current to selective payload hooks 253 to release the attached payloads.

Alternatively, logic circuit box 274 can transmit an electrical current to selective load cells 256 located within hook assemblies 238. The current change resulting from the strain applied to load cells 256 by the attached payload can then be processed by logic circuit box 274 and transmitted by serial inputs back through co-axial optical coupler 184 to helicopter 12. The serial inputs can then again be processed to determine the weight of each of the payloads or the summation of weight of the payloads.

Furthermore, logic circuit box 278 can transmit an electric current to selective proximity detectors housed within payload hook 253 so as to determine the positioning of the components of payload hook 253. Payload stress sensors within payload hook 253 are in the same orientation as in payload hook 122. The determination of whether the proximity detectors have been actuated can be processed by logic circuit box 274 and transmitted by serial inputs back through co-axial optical coupler 184 to helicopter 12.

Logic circuit box 274 as disclosed herein can be designed by those skilled in the art based on the disclosure herein. Logic circuit box 274 is energized in the same manner as logic circuit panel 121. The present invention envisions using co-axial optical coupler 184, slip rings 193 and brush contacts 195, and all other conventional methods for transferring electrical signals between stator assembly 82 and rotor assembly 84 either independently or in combination. The signals passed through co-axial optical coupler 184 and the current generated in rotor pickup coil 192 can be conveyed through either and/or both electrical cable 184 leading to payload hook 122 and/or to electrical connection 196 attached to exterior surface 88 of rotor assembly 84.

In one embodiment as shown in FIG. 6, indication lights 302 are positioned on top of support frame 230 above each payload hook 253. As a payload hook 253 is selected by the control panel within helicopter 12, indication light 302 above the selected payload hook 253 is illuminated. This enables those in helicopter 12 to determine which payload 14 is to be released before actually releasing the payload. In yet another embodiment, a speaker/microphone 304 is attached to frame assembly 18 for selectively speaking or listening from helicopter 12.

In an alternative embodiment, as depicted in FIG. 6, loading frame 228 of frame assembly 18 is cylindrical having a side wall 282 with an imaging ring 284 positioned on side wall 282 and encircling loading frame 228. Bidirectional motors (not shown) housed within loading frame 228 permit imaging ring 284 to rotate 360° in opposing directions. It is preferred that the rotation rate of ring 284 shall exceed 120° per second. Attached to imaging ring 284 is a daylight camera 286 that provides images of the payload and drop zone at light levels encountered during average daylight conditions.

A low light imaging camera 288 is also attached to imaging ring 284. Low light imaging camera 288 provides images of the payload and the drop zone at light levels normally encountered at night with existing lunar or other visible light illumination sources present. Finally, an infrared imaging camera 290 is also attached to imaging ring 284. Infrared imaging camera 290 provides images of the payload and the drop zone by utilizing available infrared radiation. The above types of cameras are available from Polaris Industries of Georgia. To assist in camera operation, broad spectrum viable light sources, e.g., electric arc or Halogen bulb, can be added to frame assembly 18 to direct light in view of the camera. Likewise, infrared light sources can also be attached to frame assembly 18 for assisting camera monitoring at night. In addition, cameras can also be purchased having built in infrared sources. Such cameras are also available from Polaris Industries of George.

Environmental containment during operation is reduced through use of 'O' rings positioned between imaging ring 284 and loading frame 228. Furthermore, heating elements (not shown) positioned within loading frame 228 allow for operation in about a 98% relative humidity. Non-operational exposure is limited to 100% humidity at external pressures of less than about 5 PSIG.

Figure 7:
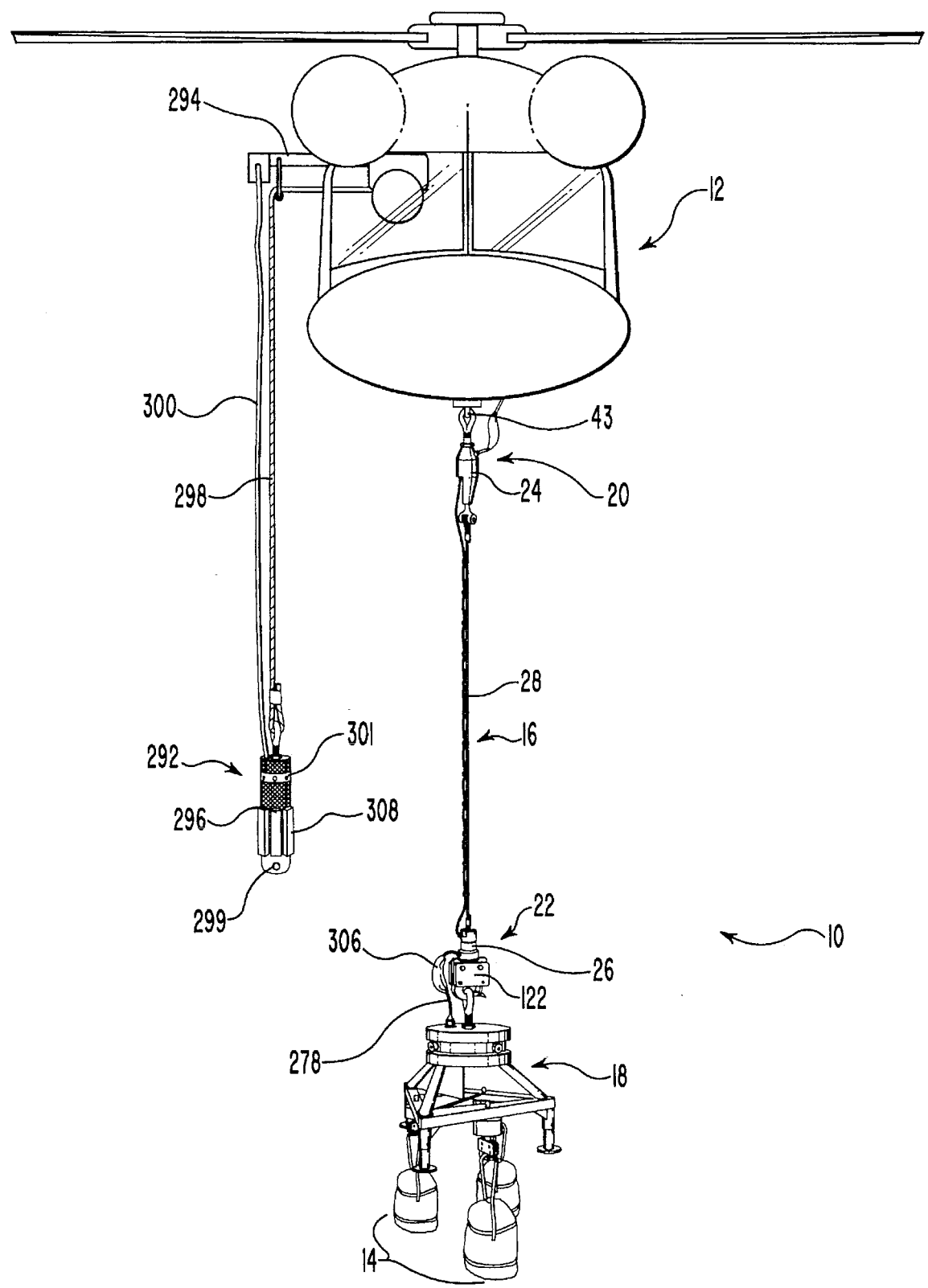
FIG. 7 is a perspective view of the front of a helicopter, the helicopter having the payload management system and a treetop penetrator attached thereto.

In yet another embodiment, as disclosed in FIGS. 1 and 7, a treetop penetration imaging assembly 292 is provided to work in combination with multiple payload system 10. Imaging assembly 292 comprises a standard cargo hoist 294 attached to helicopter 12, a penetrator 296, a hoist cable 298 extending from the hoist to penetrator 296, and a telemetry cable 300 also extending from hoist 294 to penetrator 296. Positioned within penetrator 296, are visible and infrared cameras 299. By selectively lower penetrator 296 to 1 or 2 meters above the ground, images can be transmitted to the crew within helicopter 12 that would otherwise be obscured by trees or other obstacles.

Penetrator 296 consists of a light weight damaged hardened casing that internally contains imaging components and support electronics. External mechanical components provide connection points for personal harnesses, or other slings connected to payloads with weights not exceeding the limits of hoist cable 298. Four fold down personal extraction seats 308 can also be attached to penetrator 296. Seats 308 may be extendable by ground personnel or remotely from helicopter 12. Each seat 308 will support approximately 90 kilograms. Penetrator 296 contains both visible and infrared illumination sources 301 usable in conditions where clear imaging by existing light is unfavorable. Finally, personnel on the ground may communicate with those in helicopter 12 through a microphone and speaker assembly mounted within penetrator 296.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for selectively attaching and selectively releasing multiple payloads suspended from an aircraft, the apparatus comprising:

(a) an airframe capable of supporting multiple payloads;

(b) a plurality of payload hooks attached to the airframe;

(c) means mounted on each of the payload hooks for sensing the loading position of each of the plurality of payload hooks;

(d) means for suspending the airframe at a distance below the aircraft; and (e) means for electrically and selectively actuating each of the payload hooks.

(f) means for supporting the plurality of payload hooks a distance off the ground during repetitive landing of the apparatus for attaching the individual payloads;

wherein the means for supporting the airframe off the ground comprises a plurality of legs attached to the airframe and extending below the airframe such that the plurality of legs support the payload hooks off the ground during landing of the apparatus.

2. An apparatus as recited in claim 1, wherein the plurality of legs can be selectively adjusted so as vary the distance that the payload hooks are off the ground.

3. An apparatus as recited in claim 1, further comprising means for retarding rotation of the airframe during suspended flight of the airframe.

4. An apparatus as recited in claim 3, wherein the means for retarding rotation comprises a stabilizing wing attached to the airframe, the stabilizing wing being vertically oriented and aligned with the longitudinal axis of the airframe.

5. An apparatus as recited in claim 1, wherein the airframe comprises a loading frame, a support frame, and a plurality of struts extending from the loading frame to the support frame.

6. An apparatus as recited in claim 5, wherein the support frame comprises a plurality of sides forming a polygon.

7. An apparatus as recited in claim 5, wherein the means for suspending the airframe comprises an eyelet attached to the loading frame.

8. An apparatus as recited in claim 5, wherein the plurality of payload hooks are attached to the support frame so as to extend below the support frame and further comprising an indicator lamp mounted on the support frame above each of the plurality of payload hooks, the indicator lamp electrically communicating with the payload hook which the indicator lamp is above such that when a payload hook is selected, the indicator lamp is illuminated.

9. An apparatus as recited in claim 1, wherein the means for electrically and selectively actuating each of the payload hooks comprises a logic circuit panel attached to the airframe and a plurality of electrical cables extending from the logic circuit panel to each of the payload hooks, the logic circuit panel being capable of receiving, analyzing, and transmitting electrical signals.

10. An apparatus as recited in claim 1, wherein the means for sensing the loading position of each of the plurality of payload hooks comprises each payload hook having a spring actuated hook arm designed for rotating between loading and unloading positions and a proximity detector positioned adjacent to the hook arm such that the proximity detector is actuated as the hook arm is rotated between the loading and unloading positions.

11. An apparatus as recited in claim 1, further comprising means for selectively weighing each individual payload attached to the plurality of payload hooks.

12. An apparatus as recited in claim 11, wherein the means for selectively weighing each individual payload comprises a load cell extending between the airframe and each of the payload hooks.

13. An apparatus as recited in claim 11, wherein the means for selectively weighing each individual payload comprises:
(a) a housing having a first end, a second end, and an interior surface defining a chamber and a passage extending from the second end to the chamber, the first end of the housing being attached to the airframe;
(b) a loading member freely disposed within the passage and having a first end and a second end, the first end of the loading member being positioned in the chamber and the second end of the loading member being attached to one of the plurality of payload hooks; and
(c) a load cell extending between the interior surface of the chamber and the first end of the loading member, thereby all of the weight transferred by the loading member is transferred to the load cell.

14. An apparatus as recited in claim 13, wherein the first end of the loading member has a diameter greater than the diameter of the passage, thereby the housing holds the weight of the payload if the load cell fails.

15. An apparatus as recited in claim 1, wherein the means for sensing the loading position of each of the plurality of payload hooks comprises each payload hook having:
(a) a spring actuated hook arm designed for rotating between loading and unloading positions;
(b) a latch selectively movable to lock the hook arm in the loading position; and
(c) a proximity detector positioned adjacent to the latch such that the proximity detector is actuated as the latch is moved to allow the hook arm to move between the loading and unloading positions.

16. An apparatus as recited in claim 1, wherein the means for sensing the loading position of each of the plurality of payload hooks comprises each payload hook having:
(a) a spring actuated hook arm designed for rotating between a loading and unloading position;
(b) a safety latch selectively biased against the hook arm; and
(c) a proximity detector positioned adjacent to the safety latch such that the proximity detector is actuated as the safety latch is moved when the hook arm is moved between the loading and unloading positions.

17. An apparatus for selectively attaching and selectively releasing a payload suspended from an aircraft, the apparatus comprising:
(a) a load bearing cable having a first end and a second end, the first end being for attachment to an aircraft;
(b) a payload hook being electrically actuated for selectively attaching and selectively releasing a payload attached thereto;
(c) means for attaching the second end of the load bearing cable to the payload hook such that the payload hook freely rotates relative to the longitudinal axis of the load bearing cable, the means for attaching comprising:
(i) a stator assembly comprising a first shaft, a second shaft, and a third shaft, the third shaft being aligned with and extending between the first shaft and the second shaft, the third shaft having a diameter smaller than the diameter of both the first shaft and the second shaft, the first shaft of the stator assembly being attached to the second end of the load bearing cable;
(ii) a rotor assembly comprising a housing having a first end, a second end, an interior surface defining a receiving chamber, and a lip radially extending inward from the interior surface near the first end defining an opening to the receiving chamber, the second shaft of the stator assembly being positioned within the receiving chamber with the third shaft passing through the opening, the second shaft of the stator assembly having a diameter greater than the diameter of the passage so that the second shaft is held within the receiving chamber, the second end of the rotor assembly being attached to the payload hook; and
(iii) a bearing assembly positioned between the stator assembly and the rotor assembly, thereby permitting the rotor assembly to freely rotate relative to the longitudinal axis of the load bearing cable; and
(d) means for electrically and selectively actuating the payload hook from the aircraft.

18. An apparatus as recited in claim 17, wherein the means for electrically and selectively actuating the payload hook from the aircraft comprises:
(a) an electrical cable for carrying an electrical signal extending from the aircraft to the stator assembly;
(b) means for transferring the electrical signal from the stator assembly to the rotor assembly; and
(c) an electrical cable extending from the stator assembly to the payload hook.

19. An apparatus as recited in claim 18, wherein the means for transferring the electrical signal from the stator assembly to the rotor assembly comprises a co-axial optical coupler having a first end positioned on the second shaft of the stator assembly along the longitudinal axis of the load bearing cable and a second end attached to the second end of the rotor assembly, the first end of the co-axial optical coupler being positioned adjacent to and aligned with the second end of the co-axial optical coupler.

20. An apparatus as recited in claim 19 further comprising a logic circuit board attached to the rotor assembly for processing electrical signals from the co-axial optical coupler.

21. An apparatus as recited in claim 18, wherein the means for transferring the electrical signal from the stator assembly to the rotor assembly comprises:

(a) a slip ring encircling the third shaft of the stator assembly, the slip ring being electrically connected to the electrical cable extending from the aircraft; and (b) a brush contact positioned on the interior surface of the rotor assembly so that the brush contact is biased against the slip ring, the brush contact being electrically connected to the electrical cable extending to the payload hook.

22. An apparatus for selectively attaching and selectively releasing multiple payloads suspended from an aircraft, the apparatus comprising:

(a) a load bearing cable having a first end for attachment to the aircraft and a second end;

(b) a payload hook attached to the second end of the load bearing cable;

(c) an airframe capable of supporting multiple payloads, the airframe being independently carried by and selectively connected to the payload hook at the second end of the load bearing cable;

(d) a plurality of payload hooks mounted on the airframe, each of the payload hooks being configured to hold a discrete payload directly beneath the airframe; and (e) means for electrically and selectively actuating each of the payload hooks from the aircraft.

23. An apparatus as recited in claim 22, wherein the means for electrically and selectively actuating each of the payload hooks from the aircraft comprises an electrical cable extending from the aircraft to each of the payload hook.

24. An apparatus as recited in claim 22, further comprising means for attaching the second end of the load bearing cable to the payload hook such that the payload hook freely rotates relative to the longitudinal axis of the load bearing cable.

25. An apparatus as recited in claim 24, wherein the means for attaching the second end of the load bearing cable to the payload hook such that the payload hook freely rotates relative to the longitudinal axis of the load bearing cable comprises:

(a) a stator assembly comprising a first shaft, a second shaft, and a third shaft, the third shaft being aligned with and extending between the first shaft and the second shaft, the third shaft having a diameter smaller than the diameter of both the first shaft and the second shaft, the first shaft of the stator assembly being attached to the second end of the load bearing cable;

(b) a rotor assembly comprising a housing having a first end, a second end, an interior surface defining a receiving chamber, and a lip radially extending inward from the interior surface near the first end defining an opening to the receiving chamber, the second shaft of the stator assembly being positioned within the receiving chamber with the third shaft passing through the opening, the second shaft of the stator assembly having a diameter greater than the diameter of the passage so that the second shaft is held within the receiving chamber, the second end of the rotor assembly being attached to the payload hook; and (c) a bearing assembly positioned between the stator assembly and the rotor assembly, thereby permitting the rotor assembly to freely rotate relative to the longitudinal axis of the load bearing cable.

26. An apparatus as recited in claim 22, wherein the means for electrically and selectively actuating the payload hook from the aircraft comprises:

(a) an electrical cable for carrying an electrical signal extending from the aircraft to the stator assembly;

(b) means for transferring the electrical signal between the stator assembly and the rotor assembly; and (c) an electrical cable extending from the stator assembly to the payload hook.

27. An apparatus as recited in claim 22, further comprising means for weighing the payloads when suspended from an aircraft.

28. An apparatus as recited in claim 27, wherein the means for weighing the payloads when suspended from the aircraft comprises a load cell extending between the aircraft and the first end of the load bearing cable.

29. An apparatus as recited in claim 27, wherein the means for weighing the payloads when suspended from the aircraft comprises a stress sensor including:

(a) a housing having a first end, a second end, and an interior surface defining a chamber and a passage extending from the second end to the chamber;

(b) a loading rod freely disposed within the passage and having a first end and a second end, the first end of the loading rod being positioned in the chamber and the second end of the loading rod being attached to the first end of the load bearing cable; and (c) a load cell extending between the interior surface of the chamber and the first end of the loading rod, thereby all of the weight transferred by the loading rod is transferred to the load cell.

30. An apparatus as recited in claim 29, wherein the first end of the loading rod has a diameter greater than the diameter of the passage, thereby the housing supports the payload if the load cell fails.

31. A payload management system for selectively attaching and selectively releasing multiple payloads suspended from an aircraft, the payload management system comprising:

(a) an airframe capable of supporting multiple payloads, the airframe comprising a loading frame, a support frame, and a plurality of struts extending from the loading frame to the support frame;

(b) a plurality of payload hooks attached to the loading frame of the airframe, the payload hooks being electrically actuated for selectively attaching and selectively releasing individual payloads attached thereto;

(c) a load bearing cable having a first end for attachment to an aircraft and a second end attached to the airframe; and (d) means for enabling the airframe to freely rotate relative to the load bearing cable.

32. A payload management system as defined in claim 31, further comprising a plurality of legs attached to and extending below the airframe such that the plurality of legs support the payload hooks off the ground.

33. A payload management system as defined in claim 31, further comprising a stabilizing wing attached to the airframe, the stabilizing wing being vertically oriented and aligned with the longitudinal axis of the airframe.

34. A payload management system as defined in claim 31, wherein the support frame comprises a plurality of sides forming a polygon.

35. A payload management system as defined in claim 31, further comprising a payload hook connected to the second end of the load bearing cable and attached to the airframe, the payload hook being electrically actuated for selectively attaching and selectively releasing the airframe.

36. A payload management system as defined in claim 31, further comprising a load cell extending between the aircraft and the first end of the load bearing cable to determine the weight of the payload management system.

37. A payload management system as defined in claim 31, further comprising:
   (a) a housing having a first end, a second end, and an interior surface defining a chamber and a passage extending from the second end to the chamber, the first end of the housing being attached to the aircraft;
   (b) a loading rod freely disposed within the passage and having a first end and a second end, the first end of the loading rod being positioned in the chamber and the second end of the loading rod being attached to the first end of the load bearing cable; and
   (c) a load cell extending between the interior surface of the chamber and the first end of the loading rod, thereby all of the weight transferred by the loading rod is transferred to the load cell.

38. A payload management system as defined in claim 37, wherein the first end of the loading rod has a diameter greater than the diameter of the passage, thereby the housing holds the weight of the payload management system if the load cell fails.

39. A payload management system as defined in claim 31, wherein the means for enabling the airframe to freely rotate relative to the load bearing cable comprises:
   (a) a stator assembly comprising a first shaft, a second shaft, and a third shaft, the third shaft being aligned with and extending between the first shaft and the second shaft, the third shaft having a diameter smaller than the diameter of both the first shaft and the second shaft, the first shaft of the stator assembly being attached to the second end of the load bearing cable;
   (b) a rotor assembly comprising a housing having a first end, a second end, an interior surface defining a receiving chamber, and a lip radially extending inward from the interior surface near the first end defining an opening to the receiving chamber, the second shaft of the stator assembly being positioned within the receiving chamber with the third shaft passing through the opening, the second shaft of the stator assembly having a diameter greater than the diameter of the passage so that the second shaft is held within the receiving chamber, the second end of the rotor assembly being attached to the payload hook; and
   (c) a bearing assembly positioned between the stator assembly and the rotor assembly, thereby permitting the rotor assembly to freely rotate relative to the longitudinal axis of the load bearing cable.

40. A payload management system as defined in claim 39, further comprising:
   (a) an electrical cable for carrying an electrical signal extending from the aircraft to the stator assembly;
   (b) means for transferring the electrical signal between the stator assembly and the rotor assembly; and
   (c) means for transferring the electrical signal between the rotor assembly and the plurality of payload hooks.

41. A payload management system as defined in claim 40, wherein the means for transferring the electrical signal from the stator assembly to the rotor assembly comprises a co-axial optical coupler having a first end positioned on the second shaft of the stator assembly along the longitudinal axis of the second shaft and a second end attached to the second end of the rotor assembly, the first end of the co-axial optical coupler being positioned adjacent to and aligned with the second end of the co-axial optical coupler.

42. A payload management system as defined in claim 40, wherein the means for transferring the electrical signal between the rotor assembly and the plurality of payload hooks comprises:
   (a) a logic circuit panel attached to the airframe, the logic circuit panel being capable of receiving, analyzing, and transmitting electrical signals;
   (b) an electrical cable extending from the pickup end of the co-axial optical coupler to the logic circuit; and
   (c) a plurality of electrical cables extending from the logic circuit panel to each of the payload hooks.

43. A payload management system as defined in claim 40, wherein the means for transferring the electrical signal between the stator assembly and the rotor assembly comprises
   (a) a slip ring encircling the third shaft of the stator assembly, the slip ring being electrically attached to the cable extending from the aircraft; and
   (b) a brush contact positioned on the interior surface of the rotor assembly so that the brush contact is biased against the slip ring, the brush contact being electrically connected to the electrical cable extending to the payload hook.

44. A payload management system as defined in claim 41, further comprising a transmit coil attached to the stator assembly and a pickup coil attached to the rotor assembly, the transmit coil and the pickup coil being positioned such that an electrical current passed through transmit coil will create a current in the pickup coil for energizing the logic circuit panel.

45. A payload management system as defined in claim 1, further comprising an electrical cable extending from the aircraft to each of the plurality of payload hooks.

46. A payload management system as recited in claim 31, further comprising a load cell extending between the airframe and each of the plurality of payload hooks for weighing each of the individual payloads.

* * * * *